Feb. 12, 1935. A. L. HENNE 1,990,692
FLUORATION IN THE PRESENCE OF CHLORINE AS A CATALYST
Filed Jan. 30, 1931
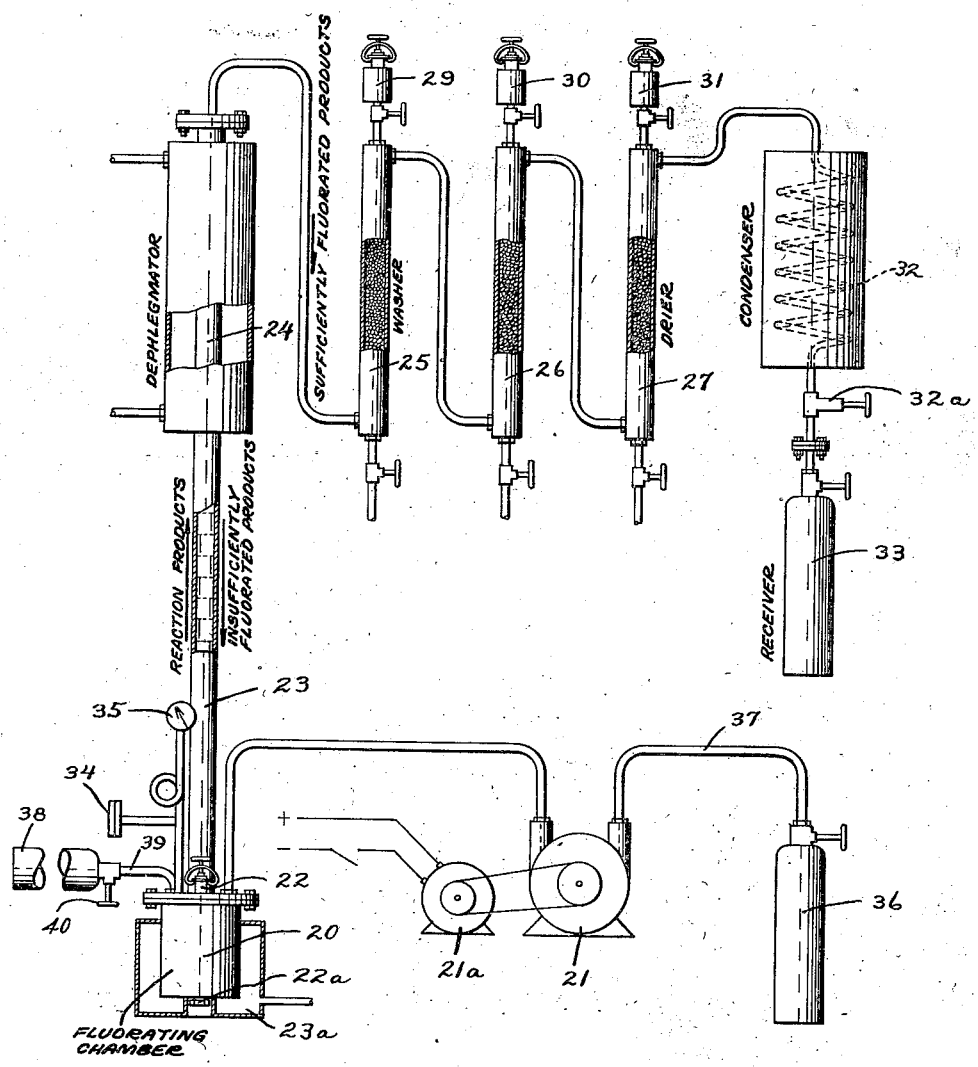
INVENTOR
Albert L. Henne
BY Spencer Hardman
ATTORNEY Patented Feb. 12, 1935

1,990,692

UNITED STATES PATENT OFFICE 1,990,692

FLUORATION IN THE PRESENCE OF CHLORINE AS A CATALYST

Albert L. Henne, Columbus, Ohio, assignor, by mesne assignments, to General Motors Corporation, a corporation of Delaware Application January 30, 1931, Serial No. 512,471

6 Claims. (Cl. 260—162)

This invention relates to processes for the fluoration of halogen hydrocarbon derivatives.

Heretofore, where fluoro and/or halo-fluoro derivatives of aliphatic hydrocarbons have been made by causing a halogen derivative of an aliphatic hydrocarbon to react with a fluorating agent in the presence of a catalytic agent, the catalytic agent such as antimony pentachloride, titanium tetrachloride, or bromine, has been relatively scarce or rather expensive or, as in the case of antimony pentachloride, it has been necessary to provide a separate process for the manufacture thereof.

The objects of my present invention are to provide a catalytic agent which will be relatively cheap and readily available and one which, being usable in either the liquid or the gaseous form, will be easy to meter, and more particularly, to provide a process or processes for manufacturing fluoro and/or halo-fluoro derivatives by causing a halogen derivative of an aliphatic hydrocarbon to react with a fluorating agent in the presence of chlorine as the catalytic agent.

In a specific example relating to the production of dichlorodifluoromethane, the reactants and the reactions are substantially as follows:

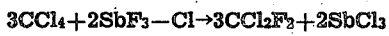

$$3CCl_4 + 2SbF_3 - Cl \rightarrow 3CCl_2F_2 + 2SbCl_3$$

it being understood that the $CCl_2F_2$ is obtained in preference to $CCl_3F$ and $CClF_3$ by suitable control of the reaction.

Ethane derivatives may be reacted upon substantially as follows:

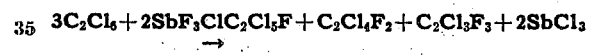

$$3C_2Cl_6 + 2SbF_3ClC_2Cl_5F + C_2Cl_4F_2 + C_2Cl_3F_3 + 2SbCl_3$$

the principal resulting compound depending upon the control exercised.

Fig. 1 illustrates diagrammatically an apparatus for carrying out the various steps of my process. In this type of apparatus a reaction chamber 20 is supplied with antimony trifluoride through the opening 22. The catalytic agent chlorine enters the reaction chamber 20 from the tank 38 through the pipe 39 under the control of the manually or automatically operated valve 40. Carbon tetrachloride is pumped from the tank 36 into the reaction chamber 20 by the pump 21, shown diagrammatically as driven by the motor 21a. The residual antimony trichloride is removed from the reaction chamber 20 through the dump valve 22a. The gaseous products ($CCl_2F_2$, $CCl_3F$ and unacted upon $CCl_4$) are admitted into the fractionating column 23 and the dephlegmator 24. The temperature of the dephlegmator is adjusted in accordance with the pressure under which the reaction takes place, so that this combination of pressure and temperature approximates the vapor pressure characteristics of the desired product. The $CCl_4$ is converted into $CCl_2F_2$ with a dephlegmator temperature of about 60° F. to 65° F. and a pressure of about 55 pounds gauge. The rate of reaction is controlled by the steam jacket 23.

The dephlegmator returns to the reaction chamber 20, the partially fluorated compound, such as monofluorotrichloromethane, $CCl_3F$, and any unacted upon carbon tetrachloride, and these compounds will be further fluorated to the desired derivative, $CCl_2F_2$. The desired pressure in the system is obtained by regulating the rate of discharge of the finished product. This may be done by manual control or by an automatically regulated discharge valve 32a.

The washer 25 contains a dilute aqueous solution of caustic soda provided from the supply chamber 29. The $CCl_2F_2$ is discharged from the dephlegmator into the washers 25 and 26. The washer 26 is likewise provided with a caustic soda solution from the chamber 30. The drier 27 contains a concentrated solution of sulphuric acid supplied from the chamber 31. Upon leaving the drier 27, the $CCl_2F_2$ passes through the condenser 32 which may be cooled to a degree necessary to liquefy the gas which is then discharged from the condenser and collected in the flask or tank 33. A relief diaphragm and a pressure gauge 35 are provided.

While I have described a method of manufacturing dichlorodifluoromethane, it is possible to obtain other derivatives of methane, for example, $CH_2ClF$, $CHCl_2F$, $CHClF_2$, $CCl_2F_2$, $CClF_3$, and $CCl_3F$, it being understood that by the process outlined above the substances fluorated in the reaction chamber 20 contain a number of chlorine atoms equal to the required sum of the chlorine and fluorine atoms in the final product. The pressures and the temperatures in the fractionating column and the dephlegmator approximate the vapor pressure characteristics of the desired product.

It is possible by my process, using chlorine as the catalytic agent, to obtain halo-fluoro derivatives of other hydrocarbons than methane. Thus, a chlorine derivative of ethane, propane or butane, etc. may be introduced into the reaction chamber 20, together with the fluorating agent $SbF_3$ and the catalytic agent, chlorine, and by subjecting gaseous reaction products to the suitable pressures and temperatures in the fractionating column 23 and a dephlegmator 24, the desired halo-fluoro derivative of any of the above hydrocarbons may be obtained. Such products are $C_2Cl_4F_2$, $C_3H_2Cl_3F_3$, and $C_4H_4Cl_2F_4$.

While I have described specific apparatus and specific steps in a process for purposes of illustration, it is understood that broadly my invention is the fluoration of halo-derivatives of aliphatic hydrocarbons in the presence of chlorine as a catalyst.

What is claimed is as follows:

1. The method of manufacturing a halo-fluoro derivative of an aliphatic hydrocarbon from a halogenated aliphatic hydrocarbon containing halogen other than fluorine which consists in contacting the hydrocarbon derivative with $SbF_3$ in the presence of chlorine as a catalytic agent, replacing at least a halogen atom other than fluorine of the hydrocarbon with fluorine, controlling the pressure and temperature conditions to drive off the desired substituting product before further fluorine substitutions have been made and returning to the reaction field insufficiently fluorated compounds.

2. The method of manufacturing a halo-fluoro derivative of methane which consists in contacting a halogen derivative of methane containing halogen other than fluorine with $SbF_3$ in the presence of chlorine as a catalyst.

3. The method of manufacturing a halo-fluoro derivative of ethane which consists in contacting a halogen derivative of ethane containing halogen other than fluorine with $SbF_3$ in the presence of chlorine as a catalyst.

4. The method of manufacturing dichlorodifluoro methane which consists in contacting $CCl_4$ with $SbF_3$ in the presence of chlorine as a catalyst.

5. The process comprising interacting a halogenated aliphatic hydrocarbon containing at least one halogen atom other than fluorine with $SbF_3$ in the presence of chlorine as a catalytic agent.

6. In the process of fluorating a halogenated aliphatic hydrocarbon containing halogen other than fluorine, the step of adding free chlorine to the reaction zone.

ALBERT L. HENNE.